(12) United States Patent
Anantapur Bache et al.

(10) Patent No.: US 9,830,474 B2
(45) Date of Patent: Nov. 28, 2017

(54) CONCEALING SENSITIVE CONTENT FROM UNAUTHORIZED USERS

(71) Applicant: INTERNATIONAL BUSINESS MACHINES CORPORATION, Armonk, NY (US)

(72) Inventors: Vijay Kumar Anantapur Bache, Bangalore (IN); Vijay Ekambaram, Tamilnadu (IN); Saravanan Sadacharam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 14/928,073

(22) Filed: Oct. 30, 2015

(65) Prior Publication Data
US 2017/0124349 A1 May 4, 2017

(51) Int. Cl.
| | | |
|---|---|---|
| H04L 29/06 | (2006.01) | |
| G06F 21/62 | (2013.01) | |
| G06F 1/16 | (2006.01) | |
| G06F 21/84 | (2013.01) | |
| G06F 21/44 | (2013.01) | |
| H04L 9/30 | (2006.01) | |

(52) U.S. Cl.
CPC .......... *G06F 21/6245* (2013.01); *G06F 1/163* (2013.01); *G06F 21/44* (2013.01); *G06F 21/84* (2013.01); *H04L 9/30* (2013.01)

(58) Field of Classification Search
CPC ...... G06F 21/6245; G06F 1/163; G06F 21/44; G06F 21/84; H04L 9/30
USPC .......................................................... 726/30
See application file for complete search history.

(56) References Cited

U.S. PATENT DOCUMENTS

| | | | | |
|---|---|---|---|---|
| 6,529,209 B1 * | 3/2003 | Dunn | ...................... | G06F 21/84 345/629 |
| 6,959,389 B1 * | 10/2005 | Dunn | .................... | H04M 3/382 340/5.2 |
| 7,191,338 B2 * | 3/2007 | Stern | ...................... | G06F 21/84 345/4 |
| 7,644,369 B2 * | 1/2010 | Hoe-Richardson | ..... | G06F 21/84 715/768 |
| 7,978,929 B2 * | 7/2011 | Kim | ........................ | G06F 21/84 380/207 |
| 8,224,118 B2 | 7/2012 | Kim et al. | | |

(Continued)

FOREIGN PATENT DOCUMENTS

WO    2009004498 A9    1/2009

*Primary Examiner* — Michael S McNally
(74) *Attorney, Agent, or Firm* — William Hartwell; Andrew D. Wright; Roberts Mlotkowski Safran Cole & Calderon P.C.

(57) ABSTRACT

A computer-implemented method includes: receiving, by a user device, a selection for content having sensitive information; generating, by the user device, an encrypted object; concealing, by the user device, the sensitive information by overlaying the encrypted object over the sensitive information; presenting, by the user device, the content with the concealed sensitive information on a display of the user device; authenticating, by the user device, a registered wearable computing device; and outputting, by the user device, the sensitive information to the registered wearable computing device for display within the wearable computing device.

18 Claims, 10 Drawing Sheets

(56) References Cited

U.S. PATENT DOCUMENTS

| | | | |
|---|---|---|---|
| 8,966,656 B2* | 2/2015 | Hirsch | G09C 5/00 |
| | | | 380/261 |
| 9,049,439 B2* | 6/2015 | Shin | G09G 3/003 |
| 9,418,215 B2* | 8/2016 | Kotla | G06F 21/36 |
| 9,514,316 B2* | 12/2016 | Kotla | G06F 21/62 |
| 2001/0026248 A1* | 10/2001 | Goren | G06F 21/62 |
| | | | 345/7 |
| 2003/0038820 A1* | 2/2003 | Purpura | G06F 21/84 |
| | | | 345/629 |
| 2004/0091110 A1* | 5/2004 | Barkans | G06F 21/84 |
| | | | 380/201 |
| 2004/0139330 A1* | 7/2004 | Baar | G06F 3/0481 |
| | | | 713/182 |
| 2007/0247392 A1* | 10/2007 | Littrell | G09G 5/00 |
| | | | 345/8 |
| 2010/0131551 A1* | 5/2010 | Benzaken | G06F 21/6245 |
| | | | 707/769 |
| 2013/0103943 A1* | 4/2013 | Hirsch | G09C 5/00 |
| | | | 713/168 |
| 2014/0078164 A1 | 3/2014 | Chan et al. | |

\* cited by examiner

CONCEALING SENSITIVE CONTENT FROM UNAUTHORIZED USERS

BACKGROUND

The present invention generally relates to concealing sensitive information displayed on user devices from unauthorized users, and more particularly, to concealing the sensitive information and displaying the sensitive information to an authorized user via a wearable computing device.

Users often utilize computer devices, such as mobile phones, tablets, laptops, etc., to view sensitive content, such as banking information, personal messages/information, student evaluation information, passwords, promotions, and/or other confidential or sensitive information. When viewing sensitive content in public areas, e.g., buses, trains, plains, stadiums, theaters, elevators, classrooms, etc., surrounding individuals are often able to view the sensitive content on the user's computer device. Existing solutions may hide sensitive information, however, the sensitive information is hidden even from an owner or authorized viewer of the sensitive information. Privacy films do not always prevent surrounding unauthorized viewers from viewing sensitive content, as privacy films obstruct the view of a computer device display only when the display is viewed at certain angles.

SUMMARY

In an aspect of the invention, a computer-implemented method includes: receiving, by a user device, a selection for content having sensitive information; generating, by the user device, an encrypted object; concealing, by the user device, the sensitive information by overlaying the encrypted object over the sensitive information; presenting, by the user device, the content with the concealed sensitive information on a display of the user device; authenticating, by the user device, a registered wearable computing device; and outputting, by the user device, the sensitive information to the registered wearable computing device for display within the wearable computing device.

In another aspect of the invention, there is a computer program product including a computer readable storage medium having program instructions embodied therewith. The program instructions are executable by the user device to cause the user device to: receive a selection for content having sensitive information; determine that the sensitive information should be concealed; generate an encrypted object based on determining that the sensitive information should be concealed; conceal the sensitive information by overlaying the encrypted object over the sensitive information; present the content with the concealed sensitive information on a display of the user device; authenticate a registered wearable computing device; and output the sensitive information to the registered wearable computing device for display within the wearable computing device.

In another aspect of the invention, there is a system including a CPU, a computer readable memory and a computer readable storage medium associated with a wearable computing device. The system includes program instructions to decrypt an encrypted object concealing sensitive information on a display of a user device; program instructions to receive the sensitive information based on decrypting the encrypted object; and program instructions to present the sensitive information in a display of the wearable computing device. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
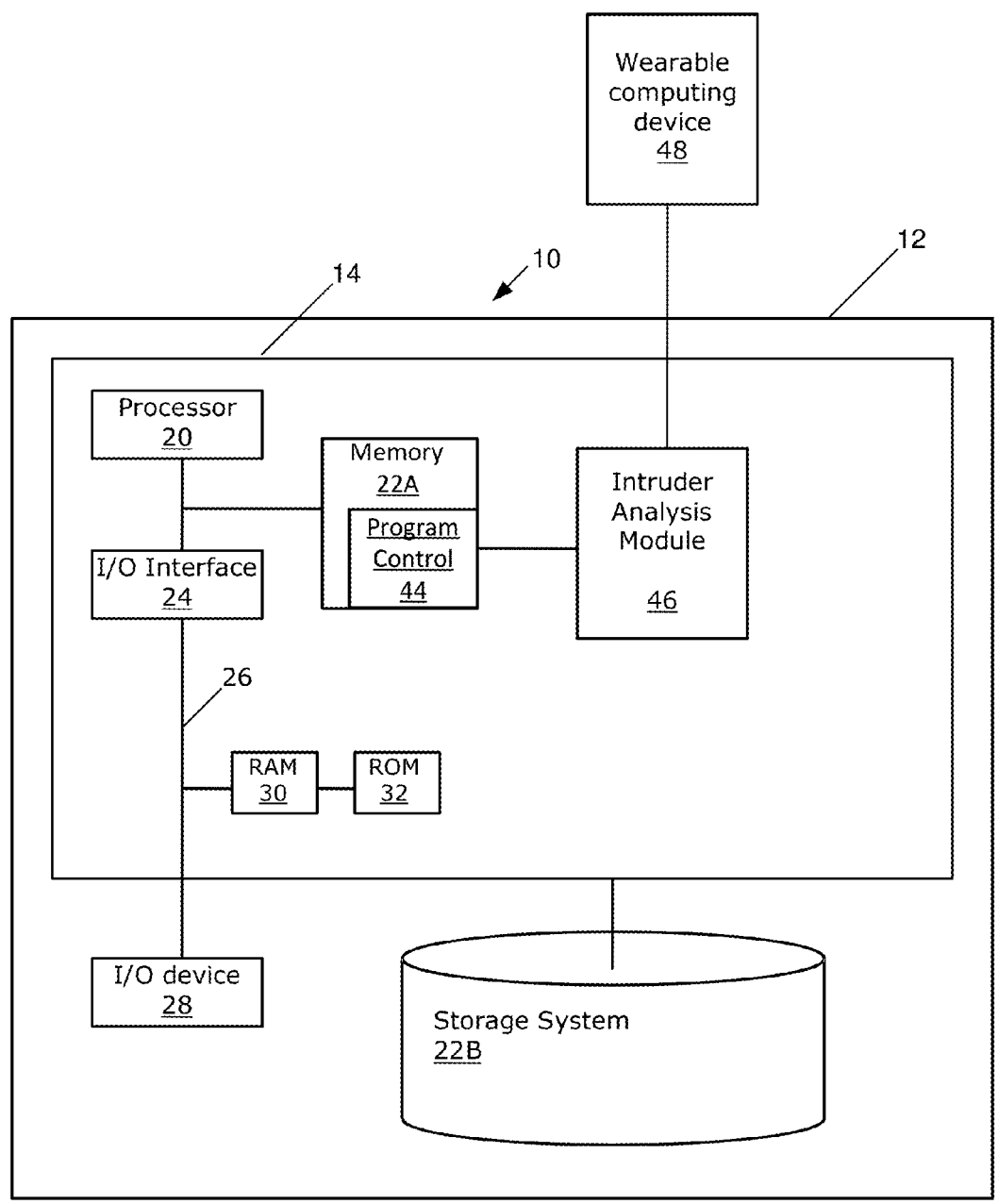
FIG. 1 depicts a computing environment according to an embodiment of the present invention.

The present invention generally relates to concealing sensitive information displayed on user devices from unauthorized users, and more particularly, to concealing the sensitive information and displaying the sensitive information to an authorized user via a wearable computing device. In accordance with aspects of the present invention, an owner or authorized viewer of sensitive information is able to view the sensitive information on a user device while simultaneously preventing unauthorized viewers from viewing the sensitive content. As described herein, a wearable computing device, such as a pair of eyeglasses having an integrated display, may display the sensitive information so that the authorized viewer of the sensitive information can view the sensitive information while simultaneously preventing others from viewing the sensitive information.

As described herein, a user device includes a computer device having an intruder analysis module that generates an encrypted object using a public key of a wearable computing device registered to an authorized viewer or user. The intruder analysis module overlays the encrypted object over the sensitive information displayed on a screen of the user device, thereby concealing the sensitive information. The registered wearable computing device decrypts the encrypted object using its private key, and displays the sensitive information within a display of the wearable computing device. Thus, the user of the registered wearable computing device is able to view the sensitive information. Surrounding individuals, e.g., unauthorized viewers, would only see the encrypted object displayed on the screen of the user device, assuming that the unauthorized viewers would not have possession of the registered wearable computing device which is used to decrypt the encrypted object and view the sensitive information.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM) 30, a read-only memory (ROM) 32, and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls an intruder analysis module 46, e.g., the processes described herein. The intruder analysis module 46 can be implemented as one or more program code in program control 44 stored in memory 22A as separate or combined modules. Additionally, the intruder analysis module 46 may be implemented as separate dedicated processors or a single or several processors to provide the function of these tools. In embodiments, the intruder analysis module 46 may communicate with a wearable computing device 48, e.g., wearable display eyeglasses, to present sensitive information on the wearable computing device 48 registered to an authorized user.

While executing the computer program code, the processor 20 can read and/or write data to/from memory 22A, storage system 22B, and/or I/O interface 24. The program code executes the processes of the invention. The bus 26 provides a communications link between each of the components in computing device 14.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
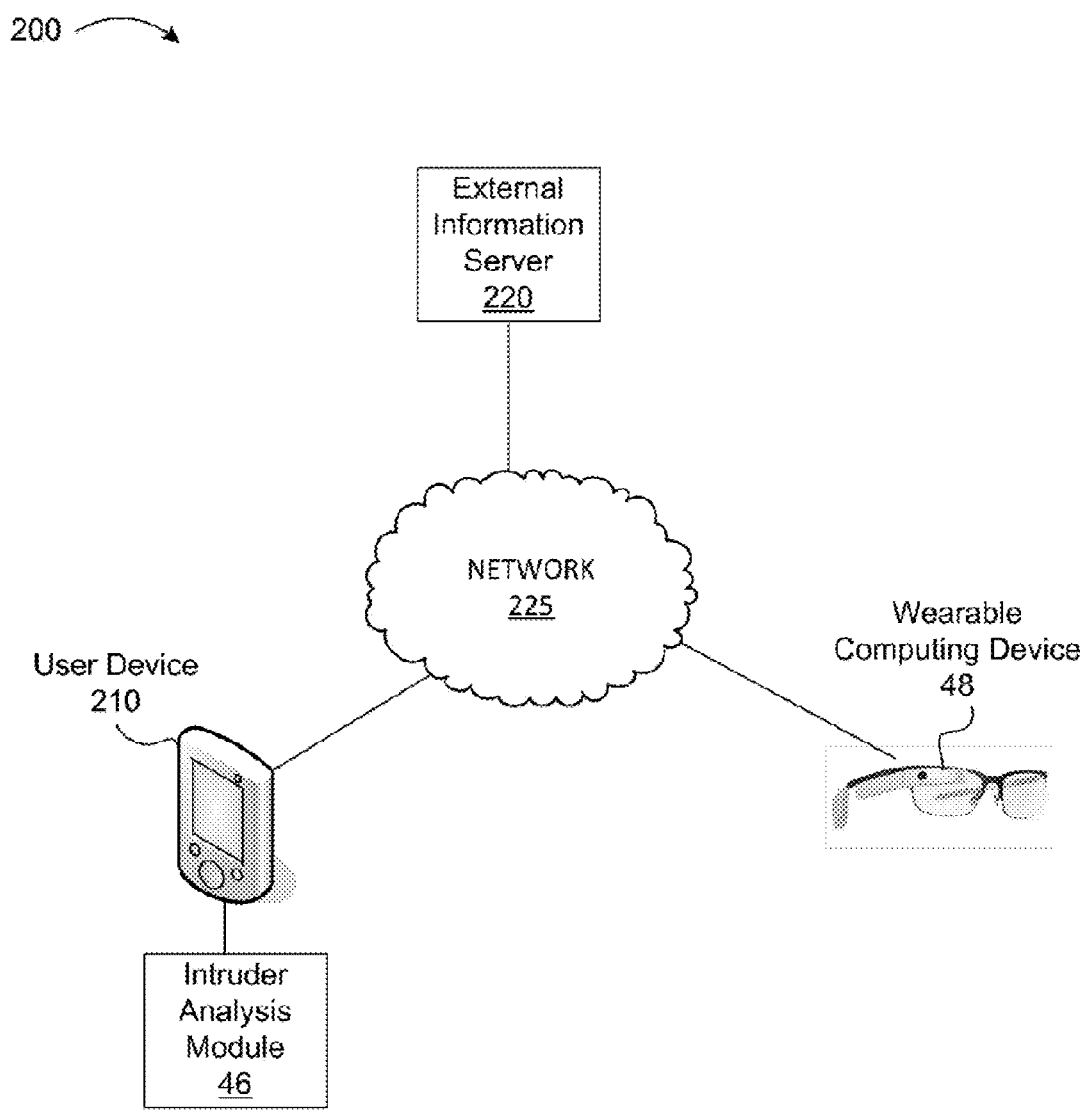
FIG. 2 shows an example environment in accordance with aspects of the present invention.
Figure 3:
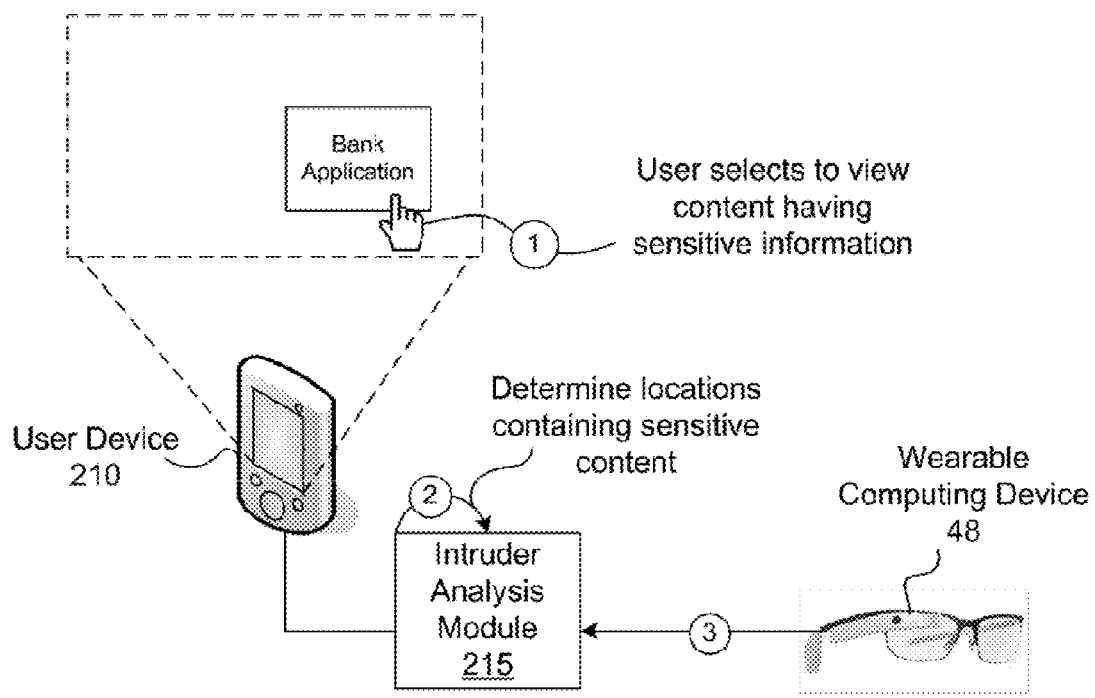
FIGS. 3, 4, 5A, 5B, 6, and 7 show an overview of an example implementation in accordance with aspects of the present invention.

FIG. 2 shows an example environment in accordance with aspects of the present invention. As shown in FIG. 2, environment 200 may include a user device 210 having an intruder analysis module 46, a wearable computing device 48, an external information server 220, and/or a network 225. In embodiments, one or more components in environment 200 may correspond to one or more components in the computing environment of FIG. 1.

The user device 210 may include a device capable of communicating via a network, such as the network 225. For example, the user device 210 may correspond to a mobile communication device (e.g., a smart phone or a personal digital assistant (PDA)), a portable computer device (e.g., a laptop or a tablet computer), or another type of device. In embodiments, the user device 210 may correspond to the computing device 14 shown in FIG. 1. The user device 210 may include an intruder analysis module 46 that receives a selection from a user of user device 210 for content having sensitive information. For example, the intruder analysis module 46 may receive a selection for sensitive information, such as banking information, when the user of user device 210 accesses a banking web page or application.

Prior to the content with the sensitive information being displayed on the user device 210, the intruder analysis module 46 may determine that the sensitive information should be hidden, determine locations on a user interface in which the sensitive information is displayed on the user device 210, obtain a public key from a wearable computing device 48 registered to the user, create an encrypted object (e.g., a quick response (QR) code) using the public key, and conceal the sensitive information by overlaying the encrypted object at the locations on the user interface having the sensitive information. The intruder analysis module 46 may then output the content with the concealed sensitive information for display on the user device 210, thereby concealing the sensitive information to surrounding viewers. The intruder analysis module 46 may authenticate the wearable computing device 48 registered to the user, and provide the sensitive information and user interface locations to the wearable computing device 48 so that the wearable computing device 48 can present the sensitive information to the user in a field of view corresponding to the location of the sensitive information on the user interface of the user device 210.

The wearable computing device 48 may include a pair of eyeglasses having an integrated display. The wearable computing device 48 may also include a scanning device to scan an encrypted object, e.g., an encrypted object that is concealing sensitive information, and decrypt the encrypted object. For a wearable computing device 48 registered to an authorized user of particular sensitive information, the encrypted object would be created using the public key of the wearable computing device 48, and the wearable computing device 48 will be able to decrypt the encrypted object in order to display the sensitive information through the integrated display. For a wearable computing device 48 not registered to an authorized user of particular sensitive information, the encrypted object would not be created using the public key of the wearable computing device 48, and the wearable computing device 48 would not be able to decrypt the encrypted object, and thus, would not be able to display the sensitive information.

The external information server 220 may include one or more computing devices that may store information identifying the locations on a display and/or a user interface of user device 210 where sensitive information is displayed. For example, different applications or pages may display sensitive information at various locations of a user interface or various locations on the screen of the user device 210. This information is used by the intruder analysis module 46 to overlay an object at user interface and display locations in which the sensitive information is display, thereby concealing the sensitive information.

The network 225 may include one or more network nodes. Additionally, or alternatively, the network 225 may include one or more wired and/or wireless networks. For example, the network 225 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 225 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

FIGS. 3, 4, 5A, 5B, 6, and 7 show an overview of an example implementation in accordance with aspects of the present invention. At step 1 shown in FIG. 3, a user of a user device 210 selects to view content having sensitive information. As an illustrative non-limiting example, the user may select a banking application. At step 2 shown in FIG. 3, prior to displaying the content from the banking application, the intruder analysis module 46 of the user device 210 determines locations containing sensitive information (e.g., the user's bank account number, bank balance, personal information, etc.). For example, the intruder analysis module 46 may determine the locations, e.g., sections and frames, on a user interface of the user device 210 that displays the sensitive information, corresponding to the locations on display of user device 210 that display the sensitive information. Information identifying the locations containing sensitive information may be user-defined and stored locally by the intruder analysis module 46. Additionally, or alternatively, the intruder analysis module 46 may communicate with an external information server 220 to obtain the information identifying the locations containing sensitive information. At step 3 shown in FIG. 3, the intruder analysis module 46 may obtain a public key from a wearable computing device 48 associated with a user of the user device 210.

Figure 4:
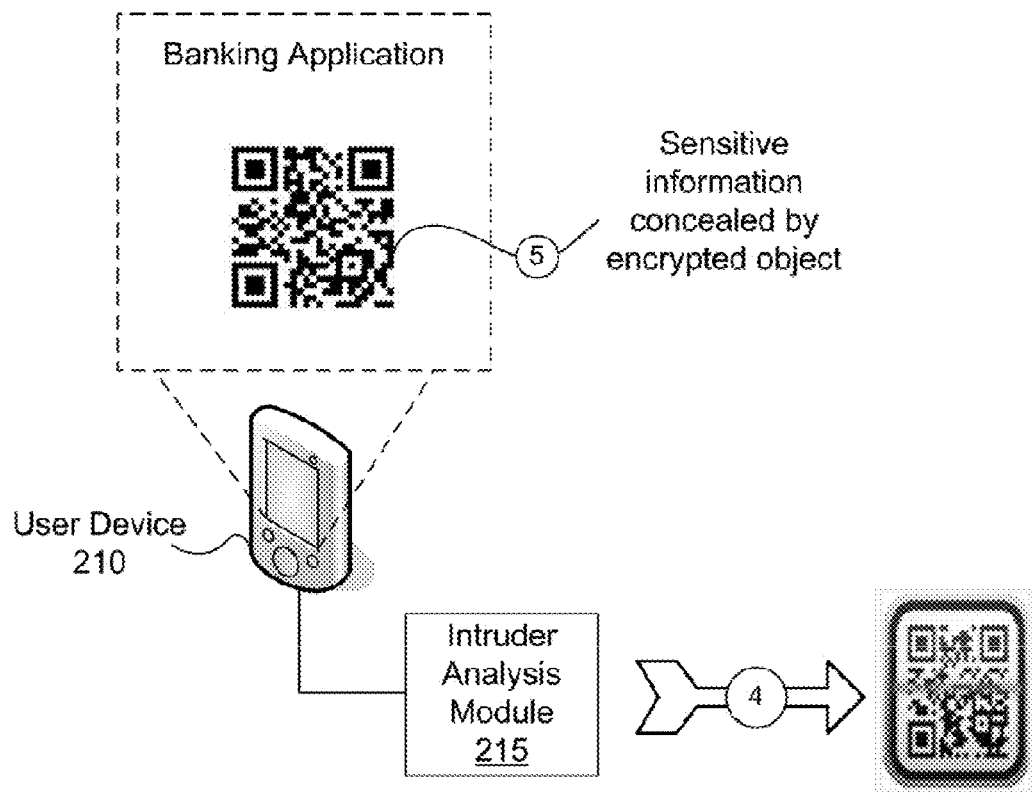

Referring to FIG. 4, at step 4, the intruder analysis module 46 generates an encrypted object 405 using the public key of the wearable computing device 48. As an illustrative example, the encrypted object 405 can be a QR code, a barcode, and/or other type of object. At step 5, the intruder analysis module 46 overlays the encrypted object 405 over the sections/frames containing the sensitive information displayed on the user device 210, and then presents the content of the application (the banking application in this example), thereby concealing the sensitive information.

Figure 5A:
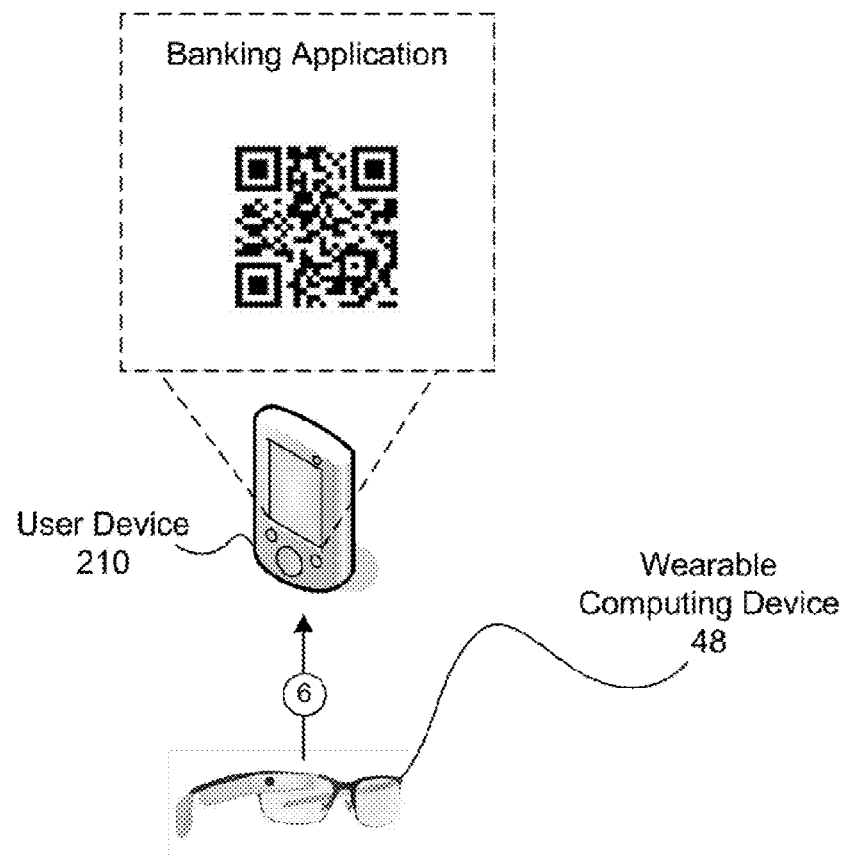

Referring to FIG. 5A, at step 6, the user of the wearable computing device 48 scans the encrypted object using the wearable computing device 48. The wearable computing device 48 then decrypts the encrypted object 405 using the private key of the wearable computing device 48. Since the encrypted object 405 was created using the public key of the wearable computing device 48, the wearable computing device 48 will be able to decrypt the encrypted object 405 using its private key. A different wearable computing device 48 associated with a different individual would therefore be unable to decrypt the encrypted object 405. In embodiments, multiple encrypted objects may be generated and placed at different portions of the user device 210 to conceal sensitive information in multiple areas of the user interface. For example, referring to FIG. 5B, an encrypted object 405-1 can be placed in at one portion of the user interface (e.g., to conceal a bank account number), and another encrypted object 405-2 can be placed at another portion of the user interface (e.g., to conceal a bank balance).

Figure 5B:
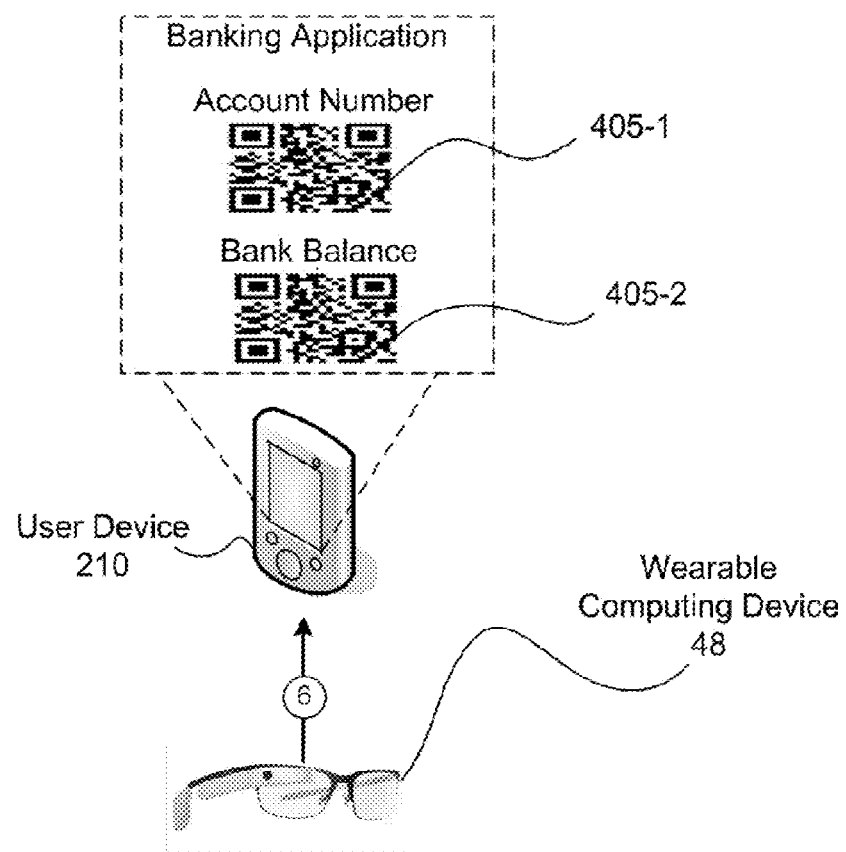
Figure 6:
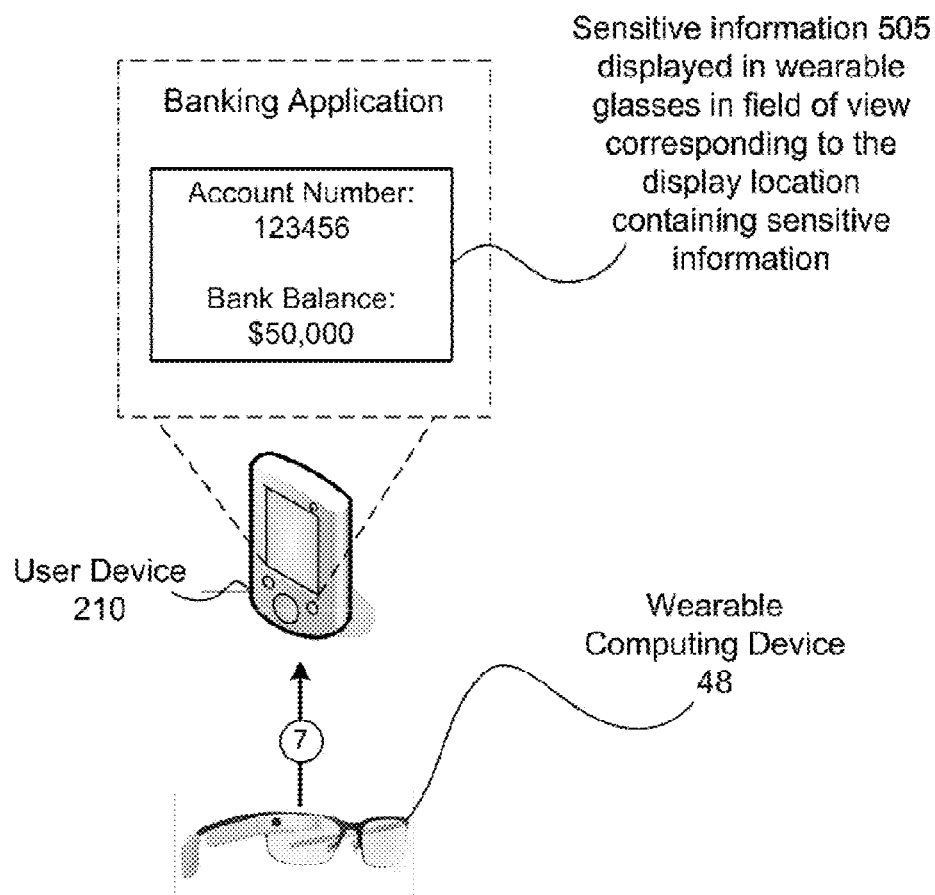
Figure 7:
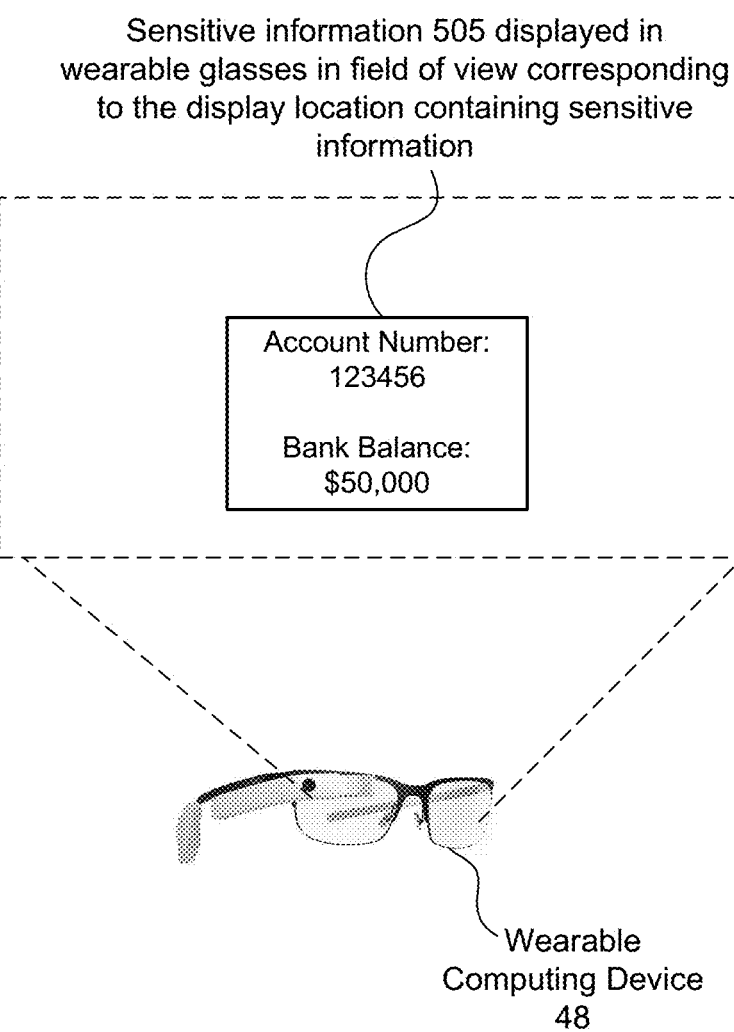

Referring to FIG. 6, at step 7, the wearable computing device 48 may receive the sensitive information after decrypting the encrypted object 405 (or after decrypting multiple encrypted objects in parallel, such as 405-1 and 405-2 of FIG. 5B). The wearable computing device 48 may display the sensitive information 505 within the wearable computing device 48 in a field of view corresponding to the location on the user device 210 where sensitive information is concealed. For example, when the wearable computing device 48 decrypts the encrypted object 405, the encrypted object 405 is still presented on the user device 210 and continues to conceal the sensitive information, however, the sensitive information is viewable to the user within the wearable computing device 48. Thus, the user is able to view the sensitive information through their wearable computing device 48, while other users, even those wearing other wearable computing devices 48, would only see the encrypted object 405 and not the sensitive information. Referring to FIG. 7, the sensitive information 505 is presented in a display of the wearable computing device 48 in a field of view corresponding to the frames on the user device 210 containing sensitive information 505 (e.g., where the encrypted object is concealing the sensitive information). In this manner, it appears to the wearer of the wearable computing device 48 that the user device 210 is displaying the sensitive information 505, while it simultaneously appears to another individual that the user device 210 is displaying the encrypted object 405.

Figure 8:
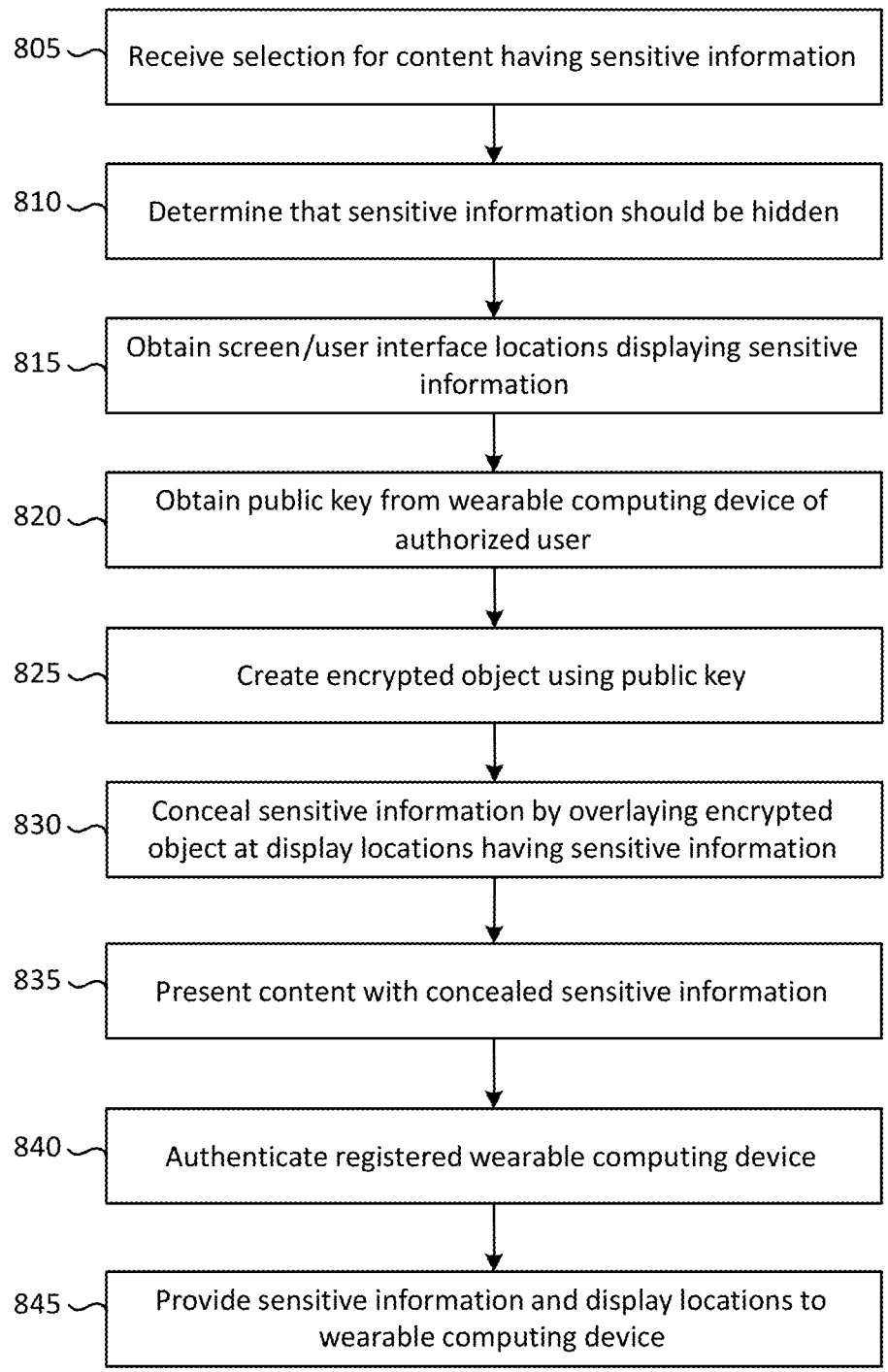
FIG. 8 shows an example flowchart for concealing sensitive content, and permitting an authorized user to view the sensitive content through a wearable device registered to an authorized user in accordance with aspects of the present invention.

FIG. 8 shows an example flowchart for concealing sensitive information and providing the sensitive information for display on a wearable device 48 registered to an authorized user. The steps of FIG. 8 may be implemented in the environments of FIG. 2, for example. As noted above, the flowchart illustrates the architecture, functionality, and operation of possible implementations of systems, methods, and computer program products according to various embodiments of the present invention.

At step 805, a selection for content having sensitive information is received. For example, the intruder analysis module 46 may receive a selection for content having sensitive information, e.g., when a user of user device 210 selects to access the content, such as when the user selects to access banking information through a banking application or webpage.

At step 810, a determination is made that the sensitive information should be concealed. For example, the intruder analysis module 46 may determine that the sensitive information should be concealed if surrounding individuals or other unauthorized viewers are potentially within view of the sensitive information. This determination can be made using one or more techniques for detecting the presence of unauthorized viewers. For example, the intruder analysis module 46 may determine that the sensitive information should be concealed by capturing an image of the surroundings of the user device 210 using a camera device of the user device 210. The intruder analysis module 46 may analyze the captured image to determine if surrounding individuals or other unauthorized viewers are potentially within view of the sensitive information.

In an alternative embodiment, the intruder analysis module 46 may identify sensitive information by using pixel-based classification techniques and/or optical character recognition (OCR) techniques to identify graphics and/or text corresponding to the sensitive information. For example, the intruder analysis module 46 may identify that the content includes text, such as "Bank account no." or other types of text that indicates the presence of sensitive information.

In embodiments, the intruder analysis module 46 may determine that the sensitive information should be hidden based on user preferences and/or when the selected content is associated with a particular application or webpage. For example, the intruder analysis module 46 may determine that the sensitive information should always be hidden when a banking app is selected by the user.

In an alternative embodiment, the intruder analysis module 46 may determine that the sensitive information need not be concealed, e.g., if surrounding individuals are not present. Alternatively, the intruder analysis module 46 may determine that no sensitive information is included in the content. In these situations, the intruder analysis module 46 may present the content as normal on a display of the user device 210, e.g., without concealing any portions of the content.

At step 815, information identifying screen/user interface locations displaying sensitive information is obtained. For example, the intruder analysis module 46 may store this information locally, and/or by accessing an external information server 220. As described herein, different applications and/or web pages may display sensitive information at different frames/sections of the user interface of the user device 210. Thus, these frames/sections are obtained so that an encrypted object can be overlaid at these frames/sections in order to conceal the sensitive information.

At step 820, a public key of the wearable computing device 48 associated with the user device 210 is obtained. For example, as described herein, a user of the user device 210 and of the wearable computing device 48 previously registers the wearable computing device 48 to the user device 210. The intruder analysis module 46 may obtain the public key of the wearable computing device 48 by sending a request for the public key to the wearable computing device 48 registered to the user device 210.

At step 825, an encrypted object is created with the public key of the wearable computing device 48. For example, the intruder analysis module 46 creates an encrypted object, such as a QR code or the like.

At step 830, the sensitive information is concealed by overlaying the encrypted object at frames/sections of the user interface and display of user device 210 having the sensitive information. For example, the intruder analysis module 46 may conceal the sensitive information.

At step 835, the content is presented with the concealed sensitive information. For example, the intruder analysis module 46 may present the content with the concealed sensitive information via a display of the user device 210.

At step 840, the registered wearable computing device 48 is authenticated. For example, the user of the registered wearable computing device 48 may scan the encrypted object using the wearable computing device 48 and decrypt the encrypted object using the private key of the wearable computing device 48. Based on decrypting the encrypted object, the intruder analysis module 46 may authenticate the wearable computing device 48. If an unregistered wearable computing device 48 attempt to decrypt the encrypted object, the intruder analysis module 46 may not authenticate the unregistered wearable computing device 48 since the unregistered wearable computing device 48 will be unable to decrypt the encrypted object.

At step 845, the intruder analysis module 46 provides the sensitive information and the display locations (e.g., the frames and sections) to the wearable computing device 48. The wearable computing device 48 may then display the sensitive information through a display of the wearable computing device 48. Further, the wearable computing device 48 may display the sensitive information in a field of view corresponding to the locations in which the sensitive information would be displayed on the user device 210 (e.g., locations in which the sensitive information is concealed by the encrypted object).

Figure 9:
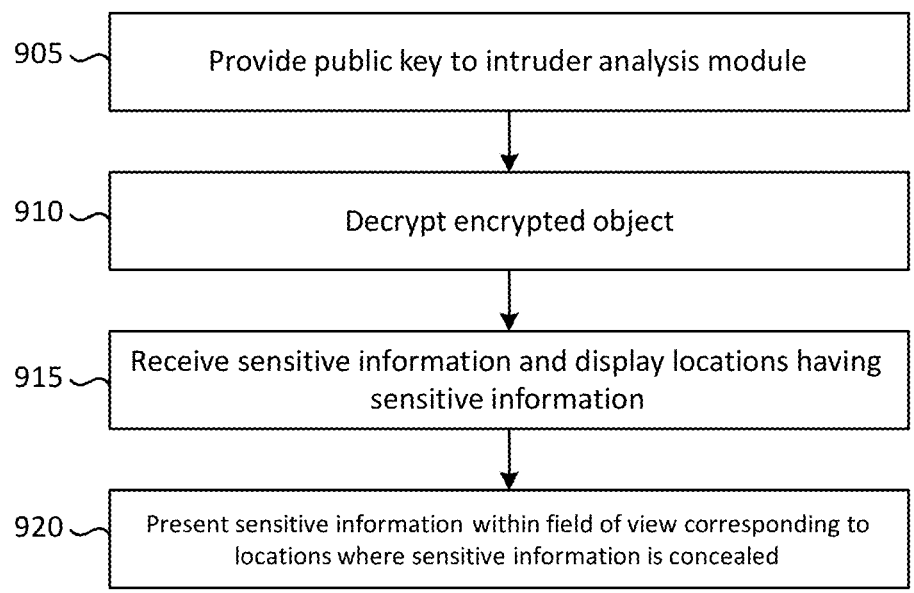
FIG. 9 shows an example flowchart for viewing sensitive content through a wearable device registered to an authorized user in accordance with aspects of the present invention.

FIG. 9 shows an example flowchart for viewing sensitive information using a registered wearable device. The steps of FIG. 9 may be implemented in the environments of FIG. 2, for example. As noted above, the flowchart illustrates the architecture, functionality, and operation of possible implementations of systems, methods, and computer program products according to various embodiments of the present invention.

At step 905, a public key of the wearable device 48 is provided to the intruder analysis module 46. For example, the wearable computing device 48 provides its public key based on receiving a request for the public key from the intruder analysis module 46 as described above.

At step 910, an encrypted object is decrypted. For example, the wearable computing device 48 may scan the encrypted object and decrypt the encrypted object using the private key of the wearable computing device 48. Assuming the wearable computing device 48 is registered to the user device 210, and that the public key of the wearable computing device 48 was used to generate the encrypted object, the wearable computing device 48 will be able to decrypt the encrypted object. In embodiments, the wearable computing device 48 may send decrypted information included in the encrypted object to the intruder analysis module 46. As described above, the intruder analysis module 46 authenticates the wearable computing device 48 when the wearable computing device 48 decrypts in the encrypted object. For example, the intruder analysis module 46 may authenticate the wearable computing device 48 based on receiving the decrypted information from the wearable computing device 48.

At step 915, the wearable computing device 48 receives the sensitive information and the display locations of the sensitive information. For example, the wearable computing device 48 may receive the frames and sections of the sensitive information.

At step 920, the wearable computing device 48 presents the sensitive information in a field of view corresponding to locations in which the sensitive information is concealed on the user device 210.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for concealing sensitive information, via a network. In this case, a computer infrastructure, such server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a user device, a selection for content having sensitive information;
generating, by the user device, an encrypted object;
concealing, by the user device, the sensitive information by overlaying the encrypted object over the sensitive information;
presenting, by the user device, the content with the concealed sensitive information on a display of the user device;
authenticating, by the user device, a registered wearable computing device, wherein the authenticating the registered wearable computing device includes receiving decrypted information associated with the encrypted object from the registered wearable device; and
outputting, by the user device, the sensitive information to the registered wearable computing device for display within the wearable computing device.

2. The method of claim 1, further comprising obtaining a public key of the registered wearable computing device based on receiving the selection for the content, wherein generating the encrypted object includes generating the encrypted object using the public key of the registered wearable computing device.

3. The method of claim 1, further comprising obtaining, based on receiving the selection for the content, information regarding sections or frames corresponding to locations in which the sensitive information is displayed on a display or user interface of the user device wherein the concealing the sensitive information includes overlaying the encrypted object at the sections or frames.

4. The method of claim 3, wherein the outputting the sensitive information includes outputting the sensitive information for display within the wearable computing device in locations of the display of the wearable device corresponding to locations on the user device in which the sensitive information is concealed.

5. The method of claim 1, wherein the sensitive information is concealed prior to displaying the content on the user device.

6. The method of claim 1, wherein the encrypted object is a quick response (QR) code.

7. The method of claim 1, wherein the wearable computing device includes a pair of eyeglasses with an integrated display.

8. The method of claim 1, further comprising determining that the sensitive information should be concealed, wherein the generating the encrypted object is based on determining that the sensitive object should be concealed.

9. The method of claim 8, wherein the determining that the sensitive information should be concealed includes capturing an image to determine that surrounding individuals are present in addition to a user of the user device.

10. The method of claim 8, wherein the determining that the sensitive information should be concealed includes identifying words or graphics in the content corresponding to the presence of the sensitive information.

11. A computer program product, the computer program product comprising a computer readable storage medium having program instructions embodied therewith, the program instructions executable by the user device to cause the user device to:
receive a selection for content having sensitive information;
determine that the sensitive information should be concealed;
generate an encrypted object based on determining that the sensitive information should be concealed, wherein the encrypted object is a quick response (QR) code;
conceal the sensitive information by overlaying the encrypted object over the sensitive information;
present the content with the concealed sensitive information on a display of the user device;
authenticate a registered wearable computing device; and
output the sensitive information to the registered wearable computing device for display within the wearable computing device.

12. The computer program product of claim 11, wherein the program instructions further cause the user device to obtain a public key of the registered wearable computing device based on receiving the selection for the content, wherein the program instructions for generating the encrypted object further cause the user device to generate the encrypted object using the public key of the registered wearable computing device.

13. The computer program product of claim 11, wherein the program instructions further cause the user device to obtain, based on receiving the selection for the content, information regarding sections or frames corresponding to locations in which the sensitive information is displayed on a display or user interface of the user device, wherein the program instructions to conceal the sensitive information cause the user device to overlay the encrypted object at the sections or frames.

14. The computer program product of claim 11, wherein the sensitive information is concealed prior to displaying the content on the user device.

15. The computer program product of claim 11, wherein the program instructions determine that the sensitive information should be concealed further cause the user device to capture an image to determine that surrounding individuals are present in addition to a user of the user device.

16. A system comprising:
   a CPU, a computer readable memory and a computer readable storage medium associated with a wearable computing device;
   program instructions to decrypt an encrypted object concealing sensitive information on a display of a user device;
   program instructions to receive the sensitive information based on decrypting the encrypted object; and
   program instructions to present the sensitive information in a display of the wearable computing device,
   wherein the program instructions are stored on the computer readable storage medium for execution by the CPU via the computer readable memory.

17. The system of claim 16, further comprising program instructions to output to the user device decrypted information associated with the encrypted object,
   wherein receiving the sensitive information is based on outputting the decrypted information.

18. The system of claim 16, wherein the program instructions to present the sensitive information include program instructions to present the sensitive information within a field of view corresponding to locations on the user device with the sensitive information is concealed.

* * * * *

UNITED STATES PATENT AND TRADEMARK OFFICE
CERTIFICATE OF CORRECTION

PATENT NO. : 9,830,474 B2  
APPLICATION NO. : 14/928073  
DATED : November 28, 2017  
INVENTOR(S) : Vijay Kumar Ananthapur Bache, Vijay Ekambaram and Saravanan Sadacharam Page 1 of 1

It is certified that error appears in the above-identified patent and that said Letters Patent is hereby corrected as shown below:

On the Title Page

Item (12), should read: Ananthapur Bache et al.

Item (72), please replace "Vijay Kumar Anantapur Bache" with "Vijay Kumar Ananthapur Bache".

Signed and Sealed this  
Fifteenth Day of April, 2025

Coke Morgan Stewart  
*Acting Director of the United States Patent and Trademark Office*